United States Patent [19]

Hoefer et al.

[11] Patent Number: 4,623,695

[45] Date of Patent: Nov. 18, 1986

[54] ACRYLATE HYDROSOLS

[75] Inventors: Rainer Hoefer, Duesseldorf; Karl-Heinz Schmid, Mettmann; Karl-Heinz Ackermann, Duesseldorf, all of Fed. Rep. of Germany

[73] Assignee: Henkel Kommanditgesellschaft auf Aktien, Duesseldorf, Fed. Rep. of Germany

[21] Appl. No.: 693,935

[22] Filed: Jan. 22, 1985

[30] Foreign Application Priority Data

Jan. 25, 1984 [DE] Fed. Rep. of Germany ....... 3402447

[51] Int. Cl.$^4$ ................................................ C08K 5/41
[52] U.S. Cl. ..................................... 524/747; 524/745; 524/748; 524/814; 524/817; 524/819; 524/820; 526/209; 526/214
[58] Field of Search ............... 526/209, 214; 524/745, 524/747, 748

[56] References Cited

U.S. PATENT DOCUMENTS

| | | | |
|---|---|---|---|
| 2,460,968 | 7/1950 | Bert et al. | 260/400 |
| 2,694,052 | 11/1954 | Canterino | 260/29.6 |
| 3,003,987 | 10/1961 | Hager et al. | 526/209 |
| 3,070,561 | 12/1962 | Hager et al. | 526/209 |
| 3,080,333 | 3/1963 | Kray et al. | 526/209 |
| 3,142,691 | 7/1964 | Wulff et al. | 260/400 |
| 3,158,632 | 11/1964 | Blaser et al. | 260/400 |
| 3,159,657 | 12/1964 | Wulff et al. | 260/400 |
| 3,202,638 | 8/1965 | Van Ess | 524/747 |
| 3,242,121 | 3/1966 | Hill | 526/209 |
| 3,251,868 | 5/1966 | Stein et al. | 260/400 |
| 3,297,621 | 1/1967 | Taft | 526/209 |
| 3,321,431 | 5/1967 | Gruden et al. | 524/748 |
| 3,370,031 | 2/1968 | Grommers et al. | 526/209 |
| 3,627,717 | 12/1971 | Kuhnen | 260/23 |
| 3,732,178 | 5/1973 | Kuhnen | 260/23 |
| 3,817,899 | 6/1974 | Türck | 524/747 |
| 3,836,497 | 9/1974 | Türck | 260/29.7 SQ |
| 3,843,584 | 10/1974 | Türck | 526/209 |
| 4,021,460 | 5/1977 | Ogoshi et al. | 260/400 |
| 4,138,380 | 2/1979 | Barabas | 526/214 |
| 4,289,667 | 9/1981 | Bush | 524/745 |
| 4,299,941 | 11/1981 | Narisawa et al. | 526/209 |
| 4,329,268 | 5/1982 | Chakrabarti et al. | 524/166 |
| 4,477,623 | 10/1984 | Pons et al. | 526/209 |

FOREIGN PATENT DOCUMENTS

| | | | |
|---|---|---|---|
| 0065253 | 11/1982 | European Pat. Off. | 524/747 |
| 2042438 | 8/1969 | Fed. Rep. of Germany | 526/209 |
| 1720430 | 10/1970 | Fed. Rep. of Germany | . |
| 3123681 | 3/1982 | Fed. Rep. of Germany | . |
| 3047897 | 7/1982 | Fed. Rep. of Germany | . |
| 0015402 | 1/1984 | Japan | 526/209 |
| 745927 | 3/1956 | United Kingdom | . |
| 1109656 | 4/1968 | United Kingdom | . |
| 1114133 | 5/1968 | United Kingdom | . |

OTHER PUBLICATIONS

J. L. Mondt, J. Oil Col. Assoc., 60, 398 (1977).
H. P. Beardsley, R. N. J. Selby, Paint Technol., 40, 263 (1968).

Primary Examiner—Joseph L. Schofer
Assistant Examiner—J. M. Reddick
Attorney, Agent, or Firm—Ernest G. Szoke; Henry E. Millson, Jr.; Mark A. Greenfield

[57] ABSTRACT

Low-viscosity acrylate hydrosols based on (meth)-acrylic acid esters and other monomers, such as styrene, methyl styrene, acrylonitrile, vinyl acetate and/or vinyl chloride, which are produced in the presence of a special mixed emulsifier of an alkyl phenol ether sulfate and an α-sulfocarboxylic acid and/or an ester thereof with a $C_1$ to $C_4$-alcohol.

11 Claims, No Drawings

ACRYLATE HYDROSOLS

BACKGROUND OF THE INVENTION

1. Field of the Invention

This invention relates to acrylate hydrosols and to a process for the production of hydrosols based on acrylates using α-sulfocarboxylic acid esters.

2. Statement of the Related Art

Hydrosols are polymer dispersions having a particularly small particle size of about 0.08 μm and smaller.

Acrylate-based hydrosols have been known for some time. They are used mainly in the coating field as primers for impregnating porous substrates (J. L. Mondt, J. Oil Col. Assoc. 60, 398 (1977) and H. P. Beardsley, R. N. J. Selby, Paint Technol. 40, 263 (1968)).

The production of pure acrylate hydrosols is described in British Pat. Nos. 1,114,133 and 1,109,656. However, the emulsion polymers described there, which are produced with corn starch or fatty alcohol sulfate as emulsifier, have to be blended with a comminution agent (of which the function is not defined) to obtain the necessary hydrosol particle fineness.

For producing hydrosols of the above type, it has already been proposed to use a combination of fatty alcohol sulfates with fatty alcohol and/or alkyl phenol ether sulfates as emulsifier. Although hydrosols produced in this way are stable and suitable for certain applications, their viscosity increases rapidly if their solids content is adjusted to more than 40% by weight. However, particularly thin-flowing products of relatively high concentration are required for applications in the coating field.

α-sulfocarboxylic acids are already known as polymerization emulsifiers, but their use in the producton of hydrosols is unknown. Descriptions of the use of α-sulfocarboxylic acids in emulsion polymerization will be found in:

| German patent application | corresponding English language patent or patent application |
|---|---|
| 17 20 430 | none (Derwent Abstract) |
| 17 70 217 | — |
| 17.70 223 | — |
| 19 01 493 | U.S. 3,732,178, G.B. 1,287,361 |
| 19 01 495 | none |
| 19 18 414 | U.S. 3,732,178 |
| 19 19 705. | none |
| 20 15 660 | U.S. 3,836,497 |
| 20 54 103 | G.B. 1,358,429 |
| 33 39 407 | — |
| — | G.B. 745,927 |
| — | U.S. 2.694,052 |

The production of α-sulfocarboxylic acid esters is described in German patent application 11 86 051 in German Pat. No. 1,248,645 and in British patent application 2,089,793 (as well as corresponding German patent application 30 47 897). Finally, a process for the production of α-sulfo fatty acid salts is described in U.S. Pat. No. 4,021,460 (and corresponding German patent application 25 44 846), according to which from 0.5 to 10% by weight of an inorganic sulfate in the form of a powder free from water of crystallization is added to a mixture of 100 parts by weight of an alkyl ester of a saturated fatty acid containing a $C_{8-22}$-fatty acid function and a $C_{1-6}$-alcohol function, followed by the addition of from 1 to 2 mols per mol of fatty acid ester of gaseous $SO_3$ in admixture with an inert gas at temperatures of up to at most 100° C. Salts of α-sulfo-fatty acid esters which may be made up in the form of highly concentrated solutions in water and which contain at most small equantities of free acids may be obtained by the process according to U.S. Pat. No. 4,404,143 (and corresponding German patent application 31 23 681) which describes the post esterification of the sulfonated product by the addition of an alcohol before neutralization.

The production of α-sulfocarboxylic acids is described in U.S. Pat. No. 2,460,968, according to which aliphatic acids containing at least 6 C-atoms are sulfonated with chlorosulfonic acid in a solvent, the chlorosulfonic acid being used in a slight excess and the gases formed (HCl) and the solvent being subsequently removed by the distillation.

DESCRIPTION OF THE INVENTION

Other than in the operating examples, or where otherwise indicated, all numbers expressing quantities of ingredients or reaction conditions used herein are to be understood as modified in all instances by the term "about".

This invention provides a process for the production of thin-flowing hydrosols based on acrylates wherein α-sulfocarboxylic acid esters, particularly α-sulfo fatty acid esters, are used in the process.

More particularly, the present invention relates to a process for the production of acrylate hydrosols by the polymerization of:

(a) from 30 to 99% by weight of at least one (meth)acrylic acid ester of a $C_{1-8}$-alcohol;

(b) from 0.5 to 7% by weight of at least one ethylenically unsaturated acid and/or an amide thereof; and (c) from 0 to 70% by weight of at least one monomer which is styrene, methyl styrene, acrylonitrile, vinyl acetate and/or vinyl chloride;

in aqueous emulsion in the presence of standard radical initiators, regulators, other auxiliaries, and alkyl phenol ether sulfates as emulsifiers, wherein at least one α-sulfocarboxylic acid alkyl ester or a salt thereof containing up to 24 carbon atoms in the carboxylic acid function and from 1 to 4 carbon atoms in the alcohol function and/or an α-sulfocarboxylic acid or a salt thereof, is used as a co-emulsifier.

The α-sulfocarboxylic acids or esters or mixtures thereof used in accordance with the invention can be produced by the prior art processes referred to above from any long-chain carboxylic acids containing from 8 to 24 carbon atoms, preferably from 12 to 18 carbon atoms. However, α-sulfo esters and acids based on naturally occurring fatty acids, particularly saturated fatty acids, are preferred. Thus, the constituents of the mixed emulsifier can be produced from pure straight chain $C_8$, $C_{10}$, $C_{12}$, $C_{14}$, $C_{16}$, $C_{18}$, $C_{20}$ or $C_{24}$ carboxylic acids. However, it is particularly preferred to produce the components of the mixed emulsifier from esters of saturated naturally occurring fatty acids. Particularly suitable starting materials are hydrogenated coconut oil fatty acid or hydrogenated tallow fatty acid. The hydrogenated coconut oil fatty acid can be replaced by hydrogenated palm kernel oil fatty acid. The hydrogenated fatty acids can be used as such or in fractionated form. In cases where it is intended to produce α-sulfo fatty acids or esters thereof containing from 18 to 22 carbon atoms, the hardened product of a rapeseed oil rich in erucic acid is preferably used as starting material.

The α-sulfocarboxylic acids used in accordance with the invention can also be produced for synthetic carboxylic acids containing from 8 to 24 carbon atoms and, more particularly, from unbranched synthetic carboxylic acids.

The process of the invention can be carried out using a α-sulfocarboxylic acid and/or an ester thereof. To obtain hydosols of particularly low viscosity, it is preferable to use mixtures of α-sulfocarboxylic acids and esters thereof. Mixed emulsifiers such as these can be obtained by mixing α-sulfocarboxylic acid esters with α-sulfocarboxylic acids. However, it is preferred to start out from α-sulfocarboxylic acid esters and to produce the required proportion of free acids in situ by hydrolysis of the ester function, hydrolysis being carried out before or during neutralization. The degree of hydrolysis can be determined from the quantities of alkali consumed and/or by titration of free carboxylic acid groups, or by spectroscopy.

According to the invention, it is preferred to use mixed emulsifiers of from 70 to 99.9 parts by weight of a sulfocarboxylic acid alkyl ester and from 0.1 to 30 parts by weight of an α-sulfocarboxylic acid. Mixtures of from 80 to 99.5 parts by weight of an α-sulfocarboxylic acid alkyl ester and from 0.5 to 20 parts by weight of a corresponding α-sulfocarboxylic acid are preferred. In that case, the products should preferably contain from 12 to 18 carbon atoms in the carboxylic acid portion. Other products suitable for use in the process of the invention are α-sulfo fatty acids and mixtures thereof with α-sulfo fatty acid esters in which the free acid content exceeds 30% by weight.

The process of the invention uses α-sulfocarboxylic acid esters containing from 1 to 4 carbon atoms in the alcohol function of the ester. Suitable esters are methyl, ethyl, propyl, ispropyl and butyl esters and also esters or partial esters of ethylene glycol, propylene glycol, glycerol or trimethylol propane. The butyl, ethyl and methyl esters are preferred.

To obtain acrylate dispersions of the requisite fineness, i.e. hydrosols, the α-sulfocarboxylic acids and/or their esters are used together with from 0.5 to 4, preferably from 1 to 3, percent by weight, based on the weight of the hydrosol, of an alkyl phenol ether sulfate. Suitable alkyl phenol ether sulfates include sulfuric acid semiesters of the reaction products of octyl and/or nonyl phenol with from 4 to 30 mols, preferably from 8 to 12 mols, of ethylene oxide per mol of phenol.

In the process of the invention, the emulsifiers are preferably dissolved in the total quantity of water.

As stated above, it is possible to use both the free acids and also salts of the α-sulfocarboxylic acids and esters. Salts include the alkali metal salts such as sodium, potassium and lithium salts, alkaline earth metal salts such as magnesium salts, ammonium salts, or amine salts. Thus, it is possible to use triethylamine salts, tetramethyl ammonium salts and, in particular, alkanolamine salts, for example dimethyl ethanolamine salts or triethanolamine salts. The salts of tris-hydroxymethylene methylamine or of 2-methyl-2-aminopropanol or propane diol can also be used.

According to the invention, the α-sulfocarboxylic acids and/or esters, or mixtures thereof are used in quantities of from 1 to 7, preferably from 1.5 to 5 percent by weight based on the weight of the dispersion as a whole. The quantity of emulsifier is also determined by the total solids content, i.e. with a relatively high solids content, larger quantities of emulsifier within the limits indicated are used. The solids content of the hydrosols, measured as dry matter, amounts to between 30 and more than 45 percent by weight. A dry matter content of more than 40 percent by weignt is preferred.

A number of substantially water-insoluble acrylate monomers can be processed into hydrosols by the process of the invention. Thus, the process of the invention is suitable for the emulsion polymerization of methyl, ethyl, isopropyl, propyl, n-butyl and/or 2-ethyl hexyl esters of acrylic acid and/or methacrylic acid or mixtures thereof. The only proviso is that an ethylenically unsaturated acid should be used in quantities of from 0.5 to 7 percent, preferably 1 to 3 percent by weight, based on the total monomer weight. Suitable unsaturated acids are monofunctional and/or difunctional unsaturated carboxylic acids or monoesters of sulfuric or sulfonic acids. Acrylic acid, methacrylic acid, crotonic acid, itaconic acid, maleic acid, fumaric acid, semiesters of these dicarboxylic acids with $C_{1-5}$-alcohols, vinyl sulfonic acid, 2-acrylamido-2-methyl propane sulfonic acid and sulfuric acid monoesters of 2-hydroxyethyl(meth)acrylate are particularly suitable. In another embodiment of the invention, the unsaturated acids can be completely or partly replaced by their amides, for example by acrylamide or methacrylamide.

Other water-insoluble monomers can be used together with the acrylate monomers for producing hydrosols by the process of the invention. For example, styrene, α-methyl styrene, acrylonitrile, vinyl acetate, vinyl esters of carboxylic acids, vinyl chloride and/or vinylidene chloride, can be used in quantities of up to 70 percent by weight, based on the total monomer weight.

Other standard polymerization auxiliaries may also be used in accordance with the invention, particularly polymerization initiators. Thus, it is possible to use inorganic peroxide compounds, such as potassium or ammonium persulfate or hydrogen peroxide, and organic peroxide or azo compounds, providing they are suitable for emulsion polymerization. The initiators are used in the usual quantities, i.e. in from 0.05 to 2, preferably from 0.1 to 0.5, percent by weight. Other auxiliaries which can be used include buffers, such as sodium hydrogen carbonate, sodium pyrophosphate or sodium acetate, which can be used in quantities of up to 2 percent by weight. Accelerators, such as formaldehyde sulfoxylate, can also be used. It is also possible to use the molecular weight regulators normally used for emulsion polymerization, such as butenol or organic thio compounds, such as mercaptoethanol, thioglycolic acid, octyl mercaptan or t-dodecyl mercaptan.

Any of the various procedures normally adopted for emulsion polymerization can be used for carrying out the process of the invention. However, the procedure commonly known as the monomer feed process is preferred. In that process, water and emulsifiers are initially introduced and the monomers are fed in either individually or in admixture during the polymerization reaction. Another possible process is the emulsion feed process or the "combined feed" process.

To that end, the temperature of the polymerization medium is normally kept between 40° and 100° C., preferably between 50° and 90° C. The pH is normally kept in the range of from 3 to 9.

The process of the invention is preferably carried out in coolable and heatable vessels equipped with stirrers and temperature measuring systems, for example in stirrer-equipped pressure vessels. However, it can also be carried out in loop reactors or in spiral tube reactors.

On completion of polymerization, the polymer dispersion is preferably cooled and run off from the vessel through sieves. If the solid product is to be isolated, the polymer dispersion is preferably precipitated or spray-dried. However, the dispersions are preferably directly used as binders for paints, adhesives and other coating purposes.

EXAMPLES

Emulsifiers used:

a: α-sulfo-$C_{12}/C_{18}$-fatty acid methyl ester, Na-salt, 36.9% by weight AS, <0.1% "di-salt" of the unesterified acid b: i-nonyl phenol+9–10 E.O .[(1)]-sulfate, Na-salt 33% by weight in water c: α-sulfo-$C_{16}/C_{18}$-fatty acid methyl ester, Na-salt containing 3.3% of "di-salt" of the unesterified acid, 28% by weight in water d: α-sulfo-$C_{16}/C_{18}$-fatty acid methyl ester, Na-salt containing 19.6% of "di-salt" of the unesterified acid, 38.2% by weight in water e: α-sulfo-$C_{16}/C_{18}$-fatty acid, di-Na-salt, 28.0% by weight in water f: $C_{12}/C_{16}$-fatty alcohol sulfate, Na-salt 30% by weight in water g: di-2-ethyl hexyl sulfosuccinate, Na-salt 71.5% by weight in water Examples I to V in Tables I and II below illustrate the invention; Comparison Examples VI and VII describe the [(1)]E.O.=ethylene oxide production of hydrosols belonging to the prior art using a combination of alkyl phenol ether sulfate/fatty alcohol sulfate. Comparison Example VIII illustrates the properties of the emulsifier combination of alkyl phenol ether sulfate and dialkyl sulfosuccinate; the reduction in viscosity lags behind the effect of the emulsifier combinations of the invention.

To produce the hydrosols, water and emulsifiers were initially introduced and the solution heated to the reaction temperature. The monomers and the initiator solution were then simultaneously added dropwise, the polymerization temperature being kept in the range of from 75° to 80° C. After the exothermic reaction had abated, the remaining 10% of the initiator solution was introduced at 82° to 90° C. to complete polymerization. The results are set out in Tables I and II.

TABLE I

|  |  | I | II | III | IV | V | VI | VII | VIII |
|---|---|---|---|---|---|---|---|---|---|
| (a) Starting solution |  |  |  |  |  |  |  |  |  |
| Water | (g) | 421.8 | 407.9 | 423.5 | 407.1 | 406.3 | 410.6 | 412.1 | 445.4 |
| Emulsifier I |  | a | c | d | c + e | e | f | f | g |
| concentration | (g) | 48.8 | 62.7 | 47.1 | 63.5 | 64.3 | 60.0 | 46.7 | 25.2 |
| Emulsifier II |  | b | b | b | b | b | b | b | b |
| concentration | (g) | 29.4 | 29.4 | 29.4 | 29.4 | 29.4 | 29.4 | 41.2 | 29.4 |
| (b) Monomer input |  |  |  |  |  |  |  |  |  |
| Styrene | (g) | 152.0 | 152.0 | 152.0 | 152.0 | 152.0 | 152.0 | 152.0 | 152.0 |
| n-butyl acrylate | (g) | 114.0 | 114.0 | 114.0 | 114.0 | 114.0 | 114.0 | 114.0 | 114.0 |
| 2-ethyl hexyl acrylate | (g) | 114.0 | 114.0 | 114.0 | 114.0 | 114.0 | 114.0 | 114.0 | 114.0 |
| Methacrylic acid | (g) | 20.0 | 20.0 | 20.0 | 20.0 | 20.0 | 20.0 | 20.0 | 20.0 |
| (c) Initiator input |  |  |  |  |  |  |  |  |  |
| Water | (g) | 97.6 | 97.6 | 97.6 | 97.6 | 97.6 | 97.6 | 97.6 | 97.6 |
| Ammonium peroxo-disulfate | (g) | 2.4 | 2.4 | 2.4 | 2.4 | 2.4 | 2.4 | 2.4 | 2.4 |
| Process |  | Monomer Feed |  |  |  |  |  |  |  |
| Polymerization temp. |  | 75–80° C. |  |  |  |  |  |  |  |
| After-polymerization |  | 82–90° C., 1 hour, remaining 10% of the initiator c added after addition of the monomers |  |  |  |  |  |  |  |

TABLE II

| | Properties of the polymer dispersions | | | | | | | |
|---|---|---|---|---|---|---|---|---|
| Formulation | I | II | III | IV | V | VI | VII | VIII |
| Coagulate content (*) (%) | <0.01 | <0.01 | <0.01 | <0.01 | <0.01 | — | — | 0.1 |
| Stirrer, |  |  |  |  |  |  |  |  |
| Wall coating (%) | 0.1 | — | — | 0.2 | 0.1 | — | — | 0.3 |
| Dry residue (%) | 43.3 | 42.6 | 43.4 | 42.7 | 43.0 | 42.3 | 42.9 | 43.1 |
| Brookfield viscosity (mPa·s) | 3000 | 502 | 644 | 330 | 170 | 17300 | 16000 | 6400 |
| Surface tension (mN/m) | 51.4 | 46.2 | 46.5 | 45.1 | 40.7 | i.d. | i.d. | 56.2 |
| Particle size (μm) | 0.033 | 0.052 | 0.053 | 0.033 | 0.032 | 0.049 | 0.048 | 0.030 | i.d. indeterminable because of excessive viscosity
(*) coagulate is an undesirable contaminant which is preferably reduced to a minimum.

What is claimed is:

1. In a process for the preparation of an acrylate hydrosol by the polymerization of
   (a) from about 30 to about 99% by weight of at least one (meth)acrylic acid ester of a $C_{1-8}$ alcohol,
   (b) from about 0.5 to about 7% by weight of at least one ethylenically unsaturated acid or amide thereof, and
   (c) from 0 to about 70% by weight of at least one monomer selected from the group consisting of styrene, methyl styrene, acrylonitrile, vinyl acetate, and vinyl chloride in aqueous emulsion, the improvement comprising carrying out the polymerization in the presence of an effective quantity of an emulsifier mixture of (i) at least one alkyl phenol ether sulfate and (ii) at least one of an α-sulfocarboxylic acid, a $C_{1-4}$ ester thereof, or a salt of either of the foregoing, wherein the carobxylic acid portion thereof contains from 8 to 24 carbon atoms.

2. A process in accordance with claim 1 wherein the acrylate hydrosol contains from about 0.5 to about 4% by weight of (i) and from about 1 to about 7 percent by weight of (ii).

3. A process in accordance with claim 2 wherein from about 1 to 3% by weight of (i) and from about 1.5 to 5% by weight of (ii) are present in the acrylate hydrosol.

4. A process in accordance with claim 1 wherein the polymerization is carried out in the presence of a radical initiator, a regulator, or both.

5. A process in accordance with claim 1 wherein in (ii) from 11 to 18 carbon atoms are in the carboxylic acid portion.

6. A process in accordance with claim 1 wherein (i) is the reaction product of 1 mole of nonyl phenol and/or octyl phenol with from 4 to 30 moles of ethylene oxide.

7. A process in accordance with claim 1 wherein the total solids content of the hydrosol is more than 40% by weight.

8. A process in accordance with claim 1 wherein (a) is a (meth)acrylic acid ester wherein the ester is selected from the group consisting of the methyl, ethyl, butyl and 2-ethyl hexyl esters.

9. A process in accordance with claim 1 wherein component (b) is selected from the group consisting of acrylic acid, methacrylic acid, itaconic acid, crotonic acid, maleic acid, fumaric acid, a semi-ester of itaconic acid, maleic acid, or fumaric acid with a $C_1$–$C_5$-alcohol, vinyl sulfonic acid, and 2-acrylamido-2-methyl propane sulfonic acid.

10. A process in accordance with claim 1 wherein in (ii) the carboxylic acid portion is derived from a naturally occurring fatty acid.

11. A process in accordance with claim 10 wherein in (ii) the carboxylic acid portion is derived from a naturally occurring saturated fatty acid.

* * * * *